June 18, 1957 J. E. HAWKINS Re. 24,330

SYSTEM FOR ANALYSIS OF SEISMOGRAPHIC RECORDS

Original Filed April 18, 1946 3 Sheets-Sheet 1

INVENTOR.
JAMES E. HAWKINS
BY Mueller and Mason
ATTORNEYS

SYSTEM FOR ANALYSIS OF SEISMOGRAPHIC RECORDS

Original Filed April 18, 1946 3 Sheets-Sheet 2

INVENTOR.
JAMES E. HAWKINS
BY Mueller and Mason

ATTORNEYS

SYSTEM FOR ANALYSIS OF SEISMOGRAPHIC RECORDS

Original Filed April 18, 1946 3 Sheets-Sheet 3

INVENTOR.
JAMES E. HAWKINS
BY Mueller and Mason
ATTORNEYS

United States Patent Office

Re. 24,330
Reissued June 18, 1957

24,330

SYSTEM FOR ANALYSIS OF SEISMOGRAPHIC RECORDS

James E. Hawkins, Broken Arrow, Okla., assignor, by mesne assignments, to Seismograph Service Corporation, Tulsa, Okla., a corporation of Delaware Original No. 2,604,955, dated July 29, 1952, Serial No. 663,205, April 18, 1946. Application for reissue July 13, 1954, Serial No. 443,191

35 Claims. (Cl. 181—.5)

Matter enclosed in heavy brackets [ ] appears in the original patent but forms no part of this reissue specification; matter printed in italics indicates the additions made by reissue.

The present invention relates to a method and apparatus for the analysis of seismographic records of the type produced in practicing seismic methods of geophysical prospecting.

When seismic methods are employed in geophysical exploration, motions of the earth are initiated by suitable means such, for example, as explosions produced beneath the earth's crust to create elastic waves which are transmitted through the earth. The initial disturbance created by the explosion is not a wave in the ordinary periodic sense of wave phenomena. However, in traveling through the earth, the disturbance acquires a periodic character in that it becomes a short pulse or damped wave train. Any discontinuities or variations of structure within the earth will reflect and refract this damped wave train or a portion thereof so that a record made at the receiving point will comprise a number of arriving waves each derived from the original pulse, and each differing from the others in time of arrival, magnitude or both. The desired information is derived from the record by determining the instant of each successive arrival. It is apparent that for certain geological structures a very complex set of waves are received and recorded at the recorder station so that the resultant record of the visual inspection type is extremely complex in character. The determination of the instant of arrival of the various waves is arrived at by record interpretation and the information to be gained from the record is sometimes so unreliable and contradictory that the record is of little value. Such records, particularly where made in regions that are not exceptionally favorable, are very difficult of solution by visual inspection.

It has been suggested that instead of recording the receipt of the various waves of a record for visual inspection, that a record which is phonographically reproducible in a manner described in U. S. Letters Patent No. 2,051,153—Rieber, be employed. Records of this type may be of the variable density or variable area type so as to lend themselves very well to scanning in the same general fashion as is employed in the scanning of talking pictures or they may be magnetically recorded as well. It has been the practice in seismic explorations where phonographically reproducible records are employed, to record all the vibrations received at the geophones and to dispense with the employment of selective filters as is the case when the visual inspection type of record is initially produced. The phonographically reproducible records such as variable area or variable density records of the seismic events can then be leisurely analyzed by repetitive reproduction thereof. It is common practice in analyzing such phonographically reproducible seismic records to finally produce therefrom a visual inspection type of record which has the undesirable wave components eliminated therefrom and essentially contains only the desirable seismic information.

One of the problems involved in the production of an acceptable visual inspection or oscillographic trace type of seismic record from a phonographically reproducible record such as variable area or variable density record which contains all of the waves received by the geophones is that of filtering from the initially recorded energy those components which may be attributed to noise or other sources of wave energy not pertinent to the ascertainment of the geological structure. The usual practice in eliminating some of the undesirable components has been that of employing relatively complicated band pass filters having adjustable upper and lower limits or combinations of filters, one or more of which may be adjustable for the purpose of suppressing the noise energy during the translation step from the initially recorded signal to a visual inspection type of trace. In general, this prior practice has several objectionable features among which were the complexity of the filtering equipment, the number of time-consuming adjustments which are required to obtain the desired pass characteristics through the filter networks and the lack of accuracy in controlling the limits of the pass characteristic through the filter networks. It is desirable, therefore, to provide a simple arrangement for selective filtering by which the undesirable energy initially recorded in connection with geophysical exploration by seismic methods may be eliminated and a final record produced containing substantially only desired information.

Accordingly, it is an object of the present invention to provide a new and improved method and apparatus for analysis of seismographic records.

It is another object of the present invention to provide a new and improved method and apparatus for analyzing seismographic records in which selective filtering of information contained on the initial record is accomplished by varying the motion of the initial record while the final record therefrom is being produced.

Still another object of the present invention is to provide a new and improved method and apparatus for converting seismograms of the phonographically reproducible type such as of the variable area or variable density type to visual inspection type traces in which the speed of movement of the seismogram during the reproduction operation is varied in accordance with a predetermined time function.

It is a further object of the present invention to provide apparatus for analyzing seismograms by converting variable area or variable density tracks to visual inspection type traces, and automatically controlling the speed of movement of the variable area or variable density tracks on the seismogram for optimum response of the amplifier filter network which is employed to exclude undesired signal energy.

It is a further object of the present invention to provide a new and improved method and apparatus for analyzing seismographic records with means for greatly decreasing the step out time in the visual inspection type traces, whereby the final records lend themselves very well to visual correlation.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which.

Figure 1:
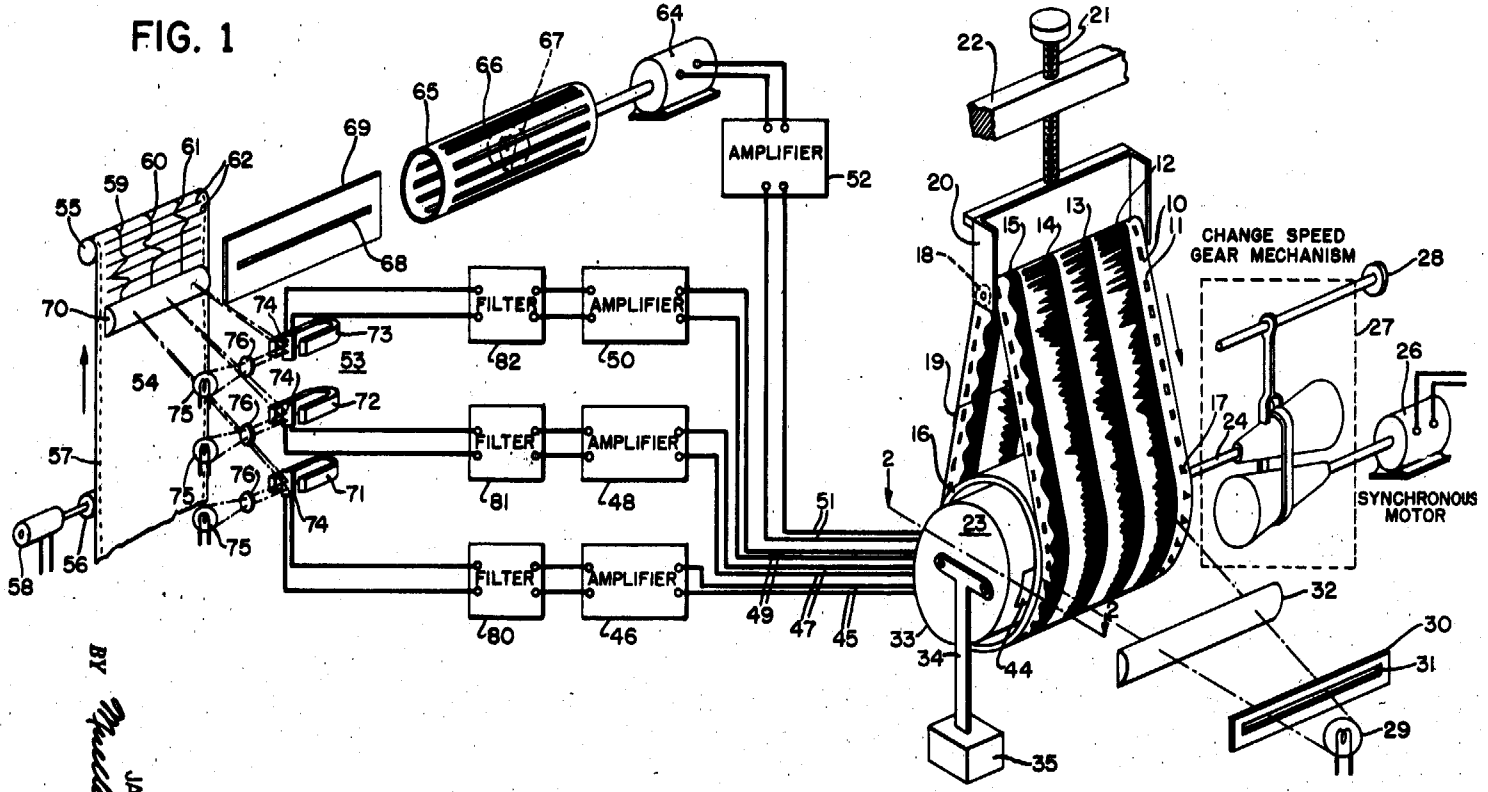
Fig. 1 is a schematic view illustrating apparatus embodying the present invention.

The present invention is concerned with the analysis of a seismographic record of the phonographically reproducible type. It will be apparent as the following description proceeds that the invention is equally applicable to analyzing any type of phonographically reproducible records. In order to specifically disclose the invention, the variable area type of record has been illustrated in Fig. 1 where there is disclosed a strip of film or record 10 having edge perforations 11. Recorded on film 10 is the seismic information obtained from a plurality of geophones during a seismic prospecting operation which information appears on film 10 as variable area tracks or traces 12, 13 and 14, respectively. A sinusoidal timing wave also of the variable area type is indicated at 15. The record or film 10 is of the usual type in which the area thereof not covered by the variable area records 12, 13, 14 and 15 is transparent.

In order to analyze the information contained on the initial record 10, which incidentally contains all of the wave information received by the geophones, the film or record 10 is inserted in the reproduction apparatus or mechanism of the present invention schematically shown in Fig. 1 of the drawings which comprises a rotatable drum 16 having at one end thereof a suitable sprocket arrangement including the teeth 17 for engagement with the edge perforations 11 of the film or record 10 and a roller 18 spaced from the drum 16 but having its axis parallel with the axis of the drum 16. The film or record 10, with its ends spliced together as indicated at 19 in Fig. 1 of the drawings to form an endless belt or loop. encircles the drum 16 and the roller 18 with the edge perforations 11 engaging the teeth 17 so as to be driven as a belt upon rotation of drum 16. In order that the reproduction apparatus comprising the drum 16 and the roller 18 can accommodate various film lengths, the roller 18 is rotatably supported by a member 20 adjustably mounted for movement toward and away from the drum 16 by means of a manually rotatable screw 21 threadedly engaging with a stationary support 22. With this arrangement the reproduction mechanism of the present invention is adapted for reproducing records of different lengths, it being merely necessary to adjust the screw 21 when it is desired to accommodate a record such as the record 10 in the form of an endless belt whose length is greater or less than that of the specific record or film 10.

To permit reproduction of the initially recorded variable area seismic traces 12, 13 and 14 in the form of curves which can be read and analyzed by visual inspection, the rotatable drum 16 is preferably constructed as a hollow, transparent drum having an open end into which is inserted a stationary detachable photo-electric cell assembly generally designated by the reference numeral 23 and described in greater detail hereinafter. The drum 16 may be formed from any transparent material such as glass, methyl methacrylate or the like and has its closed end fastened to a rotatable shaft 24 as indicated at 25. This shaft is drivingly connected to a synchronous driving motor 26 through a change-speed gear mechanism schematically indicated at 27. It will be apparent that with this arrangement the transparent drum 16 may be rotated around the photo-electric cell assembly 23 at any desired synchronous speed merely by pushing or pulling on a speed control knob 28 associated with the change-speed gear mechanism 27.

It will also be understood that the reason for employing the transparent drum 16 is to enable light rays from a suitable source to be fed through the film record 10 and the drum 16 to the photo-electric cell assembly 23. Accordingly there is provided a source of light 29 spaced a short distance away from the drum 16 on a line perpendicular with the axis of the drum and intersecting a point substantially midway between the ends thereof. Interposed between the drum 16 and the light source 29 is a mask 30 having a longitudinally extending slit 31 and a long cylindrical lens 32. Light from the source 29 in passing through the slit 31 in the mask 30 and the lens 32 whose axis is at right angles to the direction of motion of the film or record 10 as indicated by the arrow in Fig. 1 of the drawings is directed as a narrow horizontal beam through the film 10 and the transparent drum 16 to the photo-electric cell assembly 23 in the manner clearly shown in Fig. 2 of the drawings. It will be apparent that part of this beam of light will be intercepted by the variable area traces 12, 13, 14 and 15 on the film or record 10.

In order that the variations in area of the traces 12, 13, 14 and 15 which intercept the light beam from source 29 may be converted to electrical energy the photo-electric cell assembly 23 is provided. Briefly, this assembly comprises a cylindrical container 33 supported by a member 34 from a fixed support 35 and a plurality of photo-electric cells 36, 37, 38 and 39. The photo-electric cells 36, 37, 38 and 39 are supported within the container 33 in spaced relationship so as to be associated with the variable area traces 12, 13, 14 and 15, respectively, on the film or record 10. A plurality of lenses 40, 41, 42 and 43 are disposed between the associated photo-electric cells 36, 37, 38 and 39, respectively, and the light source 29 so as to focus the beams of light, part of which are intercepted by the variable area traces 12, 13, 14 and 15 on the associated photo-electric cells. The cylindrical container 33 is also provided with a longitudinally extending opening 44 through which the light from source 29 may pass on its way to the photo-electric cells 36, 37, 38 and 39. As thus arranged, the amount of light falling on a particular one of the photo-electric cells 36 to 39 inclusive depends upon the amount of light passed through the clear portion of the film upon which the narrow horizontal light beam from the source 29 is focused. Consequently the light falling on the photo-electric cells depends upon the instantaneous amplitudes of the variable area traces on the record 10, so that the electrical output of a particular photo-electric cell is proportional to the light falling upon it, or in other words, is proportional to the instantaneous amplitude of the associated variable area trace.

Figure 2:
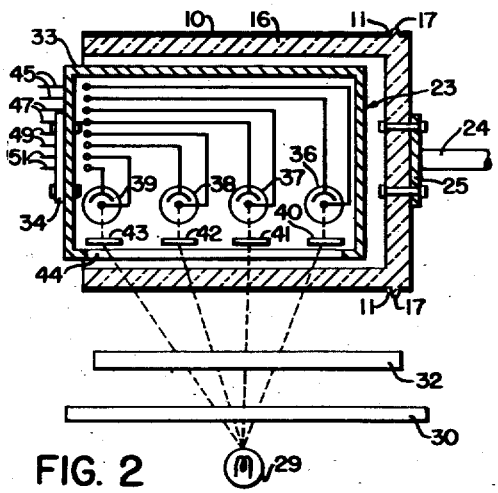
Fig. 2 is a sectional view of one of the components of the apparatus of Fig. 1 taken on line 2—2 of Fig. 1.

It will be understood that the changes in light received by the photo-electric cells 36, 37, 38 and 39 by virtue of the variable area traces 12, 13, 14 and 15, respectively, are converted to electrical changes in the output circuits of the respective photo-electric cells. As illustrated in Fig. 2 of the drawings the photo-electric cell 36 has connected thereto a pair of conductors 45, which conductors lead to the input circuit of an amplifier 46. Similarly the photo-electric cell 37 has connected thereto a pair of electrical conductors 47 which extend to the input circuit of an amplifier 48. Also the photo-electric cell 38 has connected thereto a pair of conductors 49 which are connected to the input circuit of an amplifier 50. The photo-electric cell 39, on the other hand, which is adapted to receive light intercepted by the timing trace 15 of the variable area type, has connected thereto a pair of electrical conductors 51 which are connected to the input circuit of an amplifier 52.

In order that the amplified electrical signals which appear at the output sides of amplifiers 46, 48 and 50 may be converted to curves on a record which may be visually inspected, there is provided a recording camera generally indicated at 53. Briefly, this camera comprises a movable strip of sensitized paper generally indicated at 54, which is movable from a suitable supply spool not shown to a take-up spool 55 by means of a roller 56 in the form of a sprocket having teeth for engaging edge perforations 57 in the sensitized strip 54. A suitable tape or strip driving motor 58 connected to the sprocket or roller 56 causes the paper to move in the direction of the arrow and to be transferred to the take-up spool or roller 55. Preferably the sensitized paper or strip 54 is of the type which has a record produced thereon when subjected to a beam of light and subsequently developed in the same manner as a camera film. For the purpose of illustrating the present invention, a plurality of curves or traces of the visual inspection type 59, 60 and 61 are illustrated as being produced on the sensitized strip 54. In practice, however, these curves or traces 59, 60 and 61 would not be visible in the manner indicated in Fig. 1 of the drawing until after the film has been developed.

In producing seismograms it is customary to include a time record thereon in the form of lines which extend across the face of the seismogram and which are spaced from each other by intervals of time such as one-tenth or one-hundreth of a second. As mentioned above, a time record appears on the original record or film 10 in the form of a variable area trace 15. In order that the time information contained in the trace 15 may be reproduced on the sensitive strip 54 in the form of uniformly spaced timing lines generally indicated at 62 simultaneously with the production of the traces 59, 60 and 61, the output of the amplifier 52, which is connected to the timing photoelectric cell 39, is connected to supply a synchronous motor 64 with electrical energy. It will be understood that since the area of the timing trace 15 varies periodically and as illustrated sinusoidally, the output of amplifier 52 will be an alternating current or potential having a frequency dependent upon the speed of rotation of the drum 16. The synchronous timing motor 64 is connected to drive suitable means for applying timing lines to the sensitized paper or strip 54. In the illustrated arrangement, the timing motor 64 is connected to drive a drum 65 which is provided with a plurality of uniformly spaced slits 66 extending longitudinally of the drum through which light from a source 67 within the drum 65 may be transmitted. This light is adapted to pass through a slit 68 in a mask or screening plate 69 and then through a lens 70 to produce a record line such as 62 on the sensitized strip 54. The plate or mask 69 insures that the light from only the particular slit 66 in the drum 65 which is in registry therewith can reach the sensitized paper 54 through the lens 70.

In order to record the visual inspection type traces 59, 60 and 61 on the sensitized strip 54 of the recording camera 53, this camera is further equipped with a plurality of oscillographic elements generally indicated at 71, 72 and 73. Each of the oscillographic elements 71, 72 and 73 may be of any general well-known type such, for example, as a coil rotating in a magnetic field and bearing a mirror 74 whereby light from a plurality of light sources 75 passing through appropriate lenses 76 impinges against the mirrors 73 for reflection through the lens 70 to the sensitized strip 54. The coil of oscillographic element 71 is connected to the output side of the amplifier 36 through a suitable filter 80. Similarly the coil of the oscillographic element 72 is connected to the output side of the amplifier 48 through a suitable filter 81. Also the coil of the oscillographic element 73 is connected to the output side of the amplifier 50 through a suitable filter 82. The filters 80, 81 and 82, as will become apparent as the following description proceeds, act to prevent some undesired signal energy contained in the variable area traces 12, 13 and 14 recorded on film or record 10 from appearing in the corresponding visual inspection traces 59, 60 and 61, respectively, recorded on the sensitized strip 54.

With the arrangement described thus far, it will be apparent that the variable area traces 12, 13 and 14 appearing on the record 10 are converted by photoelectric cells 36, 37 and 38, respectively, into electrical signals which are amplified and filtered and then supplied to the oscillographic elements 71, 72 and 73 to produce corresponding visual inspection traces 59, 60 and 61 on sensitized strip 54. Simultaneously with the recording of visual inspection traces 59, 60 and 61, timing lines 62 are formed on the sensitized strip 54 in correspondence with the timing track 15 on the original record or film 10. Since the timing track 15 and the seismic wave tracks 12, 13 and 14 are initially recorded on the same film or record 10, the proper phase relationship between the timing line 62 on the sensitized strip 54 and the visual inspection traces 59, 60 and 61 will be maintained regardless of the speed at which the synchronous motor 26 drives the drum 16 through the change-speed gear mechanism.

Figure 3:
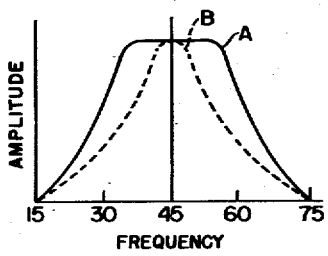
Fig. 3 is a curve diagram to aid in understanding the operation of the present invention.

In order to prevent the undesired energy components recorded by the variable area tracks 12, 13 and 14 (which are due to noise and other undesirable sources of wave energy received by the seismic detectors when the initial recording on the film 10 was made) from appearing in the traces 59, 60 and 61 on sensitized strip 54, the filters 80, 81 and 82 preferably have a fixed frequency pass band characteristic or a pass band characteristic which is symmetrically adjustable about a fixed center frequency. For example, these filters may have the fixed characteristic shown by the curve A in Fig. 3 of the drawings where energy having a frequency of between 30 and 60 cycles only is transmitted by the filters. Alternatively, they may have a characteristic adjustable between the limits illustrated by the response curves A and B in Fig. 3 of the drawings. In the latter case, the filters should have a fixed center frequency with upper and lower frequency limits symmetrically adjustable relative to the fixed center frequency.

In analyzing the seismographic records in accordance with the present invention, the variable area tracks appearing on the film or record 10 are converted to visual inspection type traces on the sensitized strip 54 in a manner which will be fully apparent from the above detailed description. The analyzer, by visual inspection of the traces appearing on sensitized strip 54 will be able to tell that there is undesirable signal energy of certain frequencies contained in the traces. Suppose, for example, that an examination of the traces 59, 60 and 61 made by rotating the drum 16 at the normal speed indicated that undesirable signal energy having a frequency of about 40 cycles is present and that the desired energy is of higher frequency. If the filters 80, 81 and 82 have a fixed pass band characteristic such as represented by the curve A in Fig. 3 of the drawings, this undesirable signal energy having a frequency of about 40 cycles contained in the traces recorded on the sensitized strip 54 can be eliminated from a new recording by adjusting the change-speed gear mechanism 27 to rotate the drum 16 at a subnormal speed. This has the effect of shifting the entire frequency spectrum of the signals picked up by the photo-electric cells 36, 37 and 38 downwardly. Consequently by lowering the speed of rotation of the film or record 10, the undesired 40 cycle energy can be changed to 25 cycle energy, for example. The filters 80, 81 and 82 which have the pass band characteristic of the curve A of Fig. 3 of the drawings will not pass the 25 cycle energy and hence the undesired 40 cycle signal energy is excluded from the oscillographic traces 59, 60 or 61 which are produced on the sensitized strip 54. It will be apparent that if the undesirable signal energy has a frequency higher than that of the desired signal energy it may be eliminated by adjusting the change-speed gear mechansm 27 to drive the drum 16 at a speed above normal, thereby converting, for example, the 40 cycle signal energy to 75 cycle energy which is excluded by the filters 80, 81 and 82.

If in a given case, the desired signal energy is in a frequency band disposed between undesired signal energies having frequencies both above and below the frequency of the desired energy, the frequency pass band characteristics of the filters 80, 81 and 82 may be expanded and contracted about a fixed center frequency fc to exclude the undesired energy. By fc is meant the mean frequency which is equal to $\sqrt{f_1 f_2}$ where $f_1$ and $f_2$ are the lower and upper cut off frequencies respectively of a band pass filter (see T. E. Shea, "Transmission Networks and Wave Filters"). In this case the change-speed gear mechanism 27 is employed in order to produce correspondence between the frequency of the desired signal energy and the fixed center frequency of the filters 80, 81 and 82.

With the described arrangement, selective filtering of the information recorded during a seismic surveying operation is normally obtained merely by using filters having a fixed frequency pass band characteristic and varying the speed of rotation of the drum 16 driven by the synchronous motor 26 through a change-speed mechanism 27. It is apparent that this method is superior to the method of varying the constants of the filter since by varying the speed of rotation of the drum 16 greater flexibility and simplification of operation is obtained. From the foregoing explanation it will be understood that in practicing the present improved method, the desired information from a seismic survey is obtained by using only one explosive charge and recording all the vibrations picked up by the geophones which would be of any possible value in the interpretation of the record obtained in any geographic area. Thereafter, reproductions of this record are made by means of the apparatus described above by selectively varying the speed of rotation of the drum 16 through manipulation of the knob 28 of the change-speed gear mechanism 27. The successive records obtained on the sensitized strip 54 by performing the selective filtering operation described above enables the analyzing group to obtain the desired seismic information, which in turn permits them to determine the particular geological structure involved in the area covered by the seismic survey.

Figure 5:
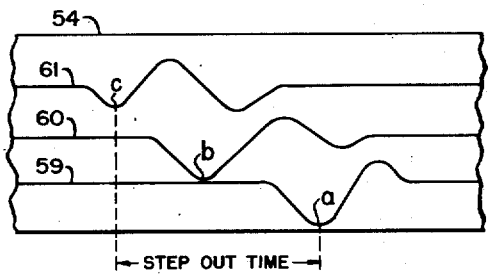
Figs. 5, 6, 7 and 8 represent portions of final records of the visual inspection or curve type obtained by analysis in accordance with the present invention.
Figure 6:
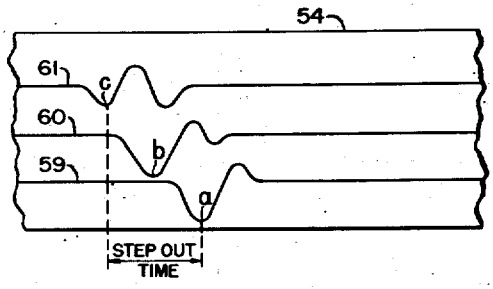

In geophysical prospecting employing seismic methods one common procedure is what is known as "reflection shooting." Information regarding the geological structure is obtained by recording the times of arrival of reflected waves at various points spaced from the "shot point" or the point where the impulse or elastic waves are created. In one of the commonest methods of reflection shooting a series of geophones are located in line with the "shot point" at some distance from the "shot point" with the geophones spaced from each other. It will be apparent that under such conditions, the record on which is simultaneously recorded the energy received at all of the geophones may be expected to show an arrival of a reflection at the most distant instrument from the "shot point" later than the arrival at the instrument or geophone nearest the "shot point." This interval between the first and last reflection arrivals is usually referred to as the "step-out" or "step out time" of the geophone or detector array. It should be understood that step out time applies to refraction shooting as well as reflection shooting. In Fig. 5 of the drawings there is illustrated a portion of the sensitized strip 54 showing the traces 59, 60 and 61. An examination of these visual inspection traces indicates that all of them have a characteristic dip indicated at a, b and c, respectively. The "step out time" is indicated by the distance between the points a and c. Since the correlation between the traces 59, 60 and 61 is visual, very low frequency impulses which have a large "step out time" as indicated in Fig. 5 of the drawings, are difficult to correlate due to a person's limited lateral range of vision. In accordance with the present invention, it is possible to produce records which are much easier to correlate even though the "step out time" is large. In Fig. 6 of the drawings there is disclosed the same portion of the traces 59, 60 and 61 recorded in Fig 5 except that the "step out time" is greatly reduced as will be apparent from a comparison of Figs. 5 and 6 of the drawings. This is accomplished in accordance with the present invention by manipulating the knob 28 of the change-speed gear mechanism 27 so as greatly to increase the speed of rotation of the drum 16. Also in this connection, the filters 80, 81 and 82 are preferably wide band filters which will not attenuate the higher frequencies produced by the photo-electric cells 36, 37 and 38 at the high drum speeds. Increasing the speed of the reproduction mechanism decreases the record length over which a given "step out time" is recorded, as will be apparent from a comparison of Figs. 5 and 6 of the drawings. Thus correlation of the traces by the visual inspection method becomes easier since the limited lateral range of vision does not interfere with the correlation of the traces of Fig. 6. In addition, the lateral extent of each reflection is reduced thereby facilitating correlation of the traces as will be seen by comparing the traces 59, 60 and 61 of Fig. 6 of the drawings with the corresponding traces in Fig. 5.

Figure 4:
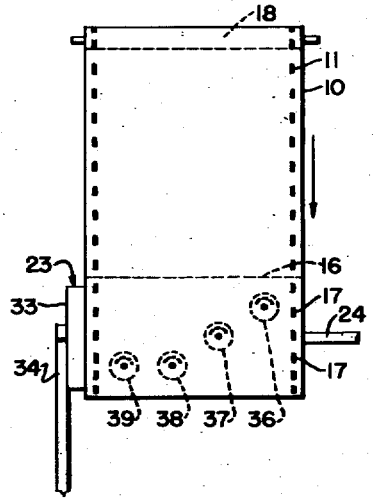
Fig. 4 is an elevational view illustrating a modification of a portion of the apparatus shown in Fig. 1.
Figure 7:
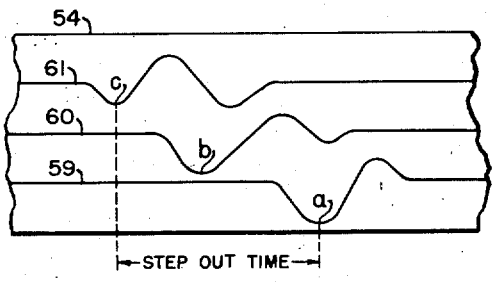
Figure 8:
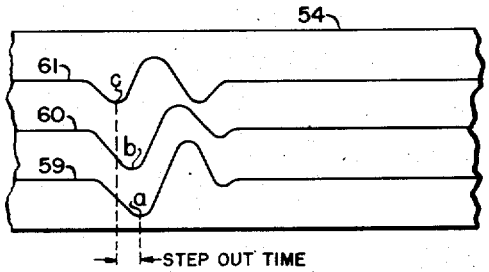

In accordance with still another modification of the present invention, correlation between the visual inspection type traces having a large "step out time" may be greatly facilitated by displacing the photo-electric cells within the photo-electric cell assembly 33 relative to one another. Referring now to Fig. 4 of the drawings there is illustrated a portion of the reproduction device of Fig. 1 with the corresponding parts thereof designated by the same reference numerals. The photo-electric cells 38 and 39 are positioned in exactly the same way as in Figs. 1 and 2. However, the photo-electric cell 37 is displaced relative to the photo-electric cells 38 and 39 in a direction opposite to the film motion as indicated by the arrow in Fig. 4 of the drawings. With this arrangement impulses which are actually displaced from each other as recorded in the variable area tracks 13 and 14 may be caused to appear substantially simultaneously when converted to visual inspection type traces 60 and 61 respectively. Similarly, by displacing photo-electric cell 36 in a direction opposite to the film motion relative to photo-electric cell 37 a record such as is shown in Fig. 7 of the drawings having a large "step out time" may be converted to the type of record shown in Fig. 8 where the "step out time" is reduced approximately to zero. The traces 59, 60 and 61 in Fig. 7 of the drawings are designated by the same reference numerals in the modified record of Fig. 8. The amount of displacement between the photo-electric cells 37 and 38 and between the photo-electric cells 36 and 37 is determined by the apparent normal velocity at which the energy would be expected to arrive at the geophones which initially received the energy recorded in the variable area tracks and converted by the photo-electric cells 36, 37 and 38 to electrical impulses which are subsequently changed to a visual inspection type of trace or record. It will be apparent that instead of displacing the cells 36, 37 and 38 in the manner indicated in Fig. 4 of the drawings a similar result can be accomplished by inserting electrical delay networks in the electrical output circuits of these cells. With this modification the photo-electric cells can be positioned in the same manner as in Figs. 1 and 2 of the drawings while producing the same results as the arrangement disclosed in Fig. 4 of the drawings.

Figure 9:
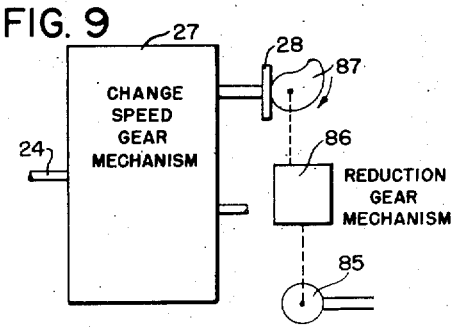

It is well established in the reflection method of seismic prospecting that the reflected energy usually decreases in frequency with time. It is thus apparent that in the usual seismic energy recording operation, wherein the filters are preset at some predetermined value, optimum results for all portions of the record are not realized. In accordance with the present invention selective filtering may be accomplished to take care of the decrease in frequency of the reflected energy with time. By changing the speed of the rotating drum 16 of Fig. 1 during a reproduction operation to conform with the change in frequency of the reflected energy with time, the optimum adjustment for the filtering operation to compensate for the variation of the frequency of the reflections can be obtained. In accordance with the present invention, therefore, the speed of rotation of the drum 16 during a reproducing operation can be controlled in accordance with a predetermined time function. Thus the first part of the record during a reproduction operation might be run slowly while the last part of the record is run much more rapidly to compensate for the decrease in frequency of the reflected energy. In Fig. 9 there is illustrated a portion of the apparatus of Fig. 1 having like components designated by the same reference numerals as in Fig. 1 and having means associated therewith for controlling the speed of rotation of drum 16 in accordance with a predetermined time function. A suitable motor 85 energized from any source of potential may be connected through a reduction gear mechanism 86 to rotate a cam 87 which has a configuration such as to control the speed of rotation of drum 16 in accordance with a predetermined time function. The cam 87 engages with the speed-change knob 28, moving it to the left as viewed in Fig. 9 of the drawings as cam 87 is rotated in the clockwise direction indicated by the arrow, thereby increasing the speed of drum 16 during a reproduction operation. Preferably the motor 85 is started at a time corresponding to the "time break" appearing at the beginning of a seismic record and the speed of drum 16 is increased, while a reproduction of the film or record 10 is made, to counteract for the decrease in frequency of the reflected energy with time. In view of the detailed description included above the operation of the arrangement disclosed in Fig. 9 of the drawings will be apparent to those skilled in the art.

Figure 10:
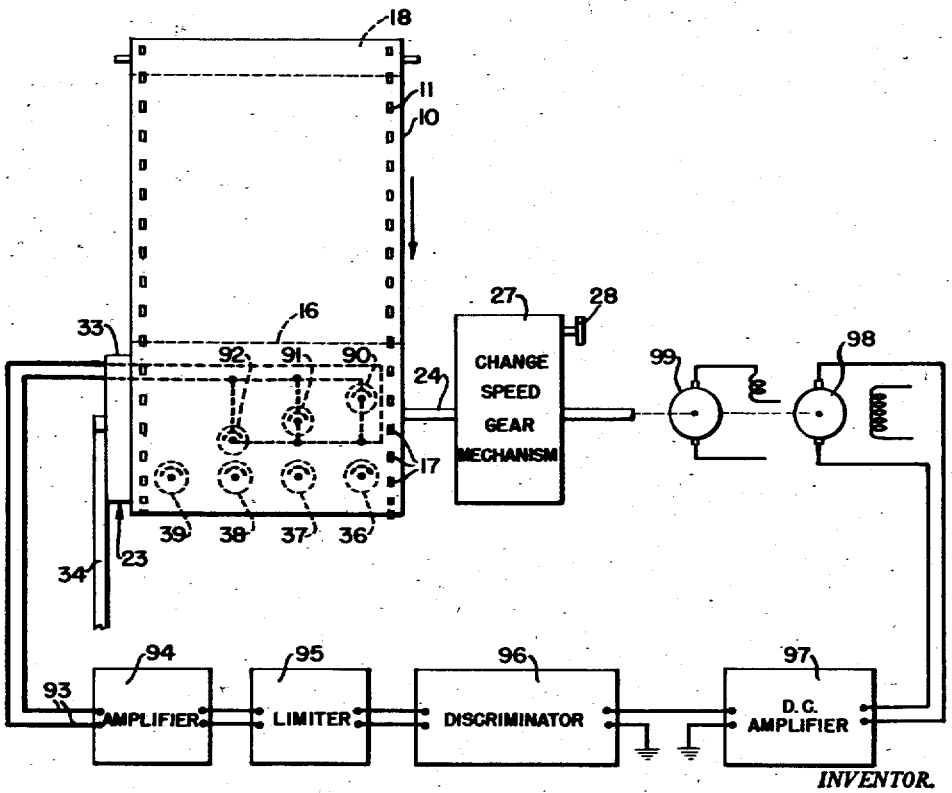
Figs. 9 and 10 are schematic views illustrating still other modifications of the present invention.

In some cases reflected energy in seismic prospecting of the reflection shooting type does not decrease in frequency with time but instead may vary in an irregular fashion. This may make it difficult to predetermine the proper time function for speed adjustment and it may be practically impossible to design a cam such as the cam 87 which will compensate for the frequency changes of the reflected energy with time. In accordance with another modification of the present invention, illustrated in Fig. 10 of the drawings, an arrangement is provided which will automatically adjust the speed of the rotating drum 16 and consequently the film speed in accordance with frequency variations of the reflected energy. The corresponding parts of Fig. 10 are designated by the same reference numerals as in the preceding figures. Referring now to Fig. 10 of the drawings, the photoelectric cell assembly 23 in addition to including the photoelectric cells 36, 37, 38 and 39, also includes photo-electric cells 90, 91 and 92 which are designated as the "leading" photo-electric cells since they are located a short distance ahead of the associated photo-electric cells 36, 37 and 38, respectively, with reference to the direction of film movement indicated by the arrow in Fig. 10 of the drawings. In accordance with the present invention, the output of the photo-electric cells 90, 91 and 92 is used automatically to adjust the speed of the drum 16 to the optimum value in the manner described below. The "leading" photo-electric cells 90, 91 and 92 are arranged to intercept the light energy controlled by the variable area traces 12, 13 and 14, respectively before this light is intercepted by the photo-electric cells 36, 37 and 38. The outputs of the photo-electric cells 90, 91 and 92 are so combined that their responses are algebraically added. As indicated in Fig. 10 of the drawings the photo-electric cells 90, 91 and 92 are arranged in the normal "step-out" manner of the reflections in accordance with the disclosure of Fig. 4 of the drawings so that the reflected energy in all of the traces will occur in phase in so far as the outputs of the photo-electric cells 90, 91 and 92 are concerned. By combining the energy outputs of the photo-electric cells 90, 91 and 92 in the manner indicated the combination distinguishes between reflected energy and other undesirable types of energy since the reflected energy has an additive effect, whereas the random energy tends to cancel itself out.

In order to control the speed of rotation of the drum 16 in [response] *response* to the changes in frequency of the reflected energy, the electrical output of the photo-electric cells 90, 91 and 92 is connected by suitable conductors 93 with an amplifier 94 which amplifies the electrical energy, whereupon this amplified energy is supplied to a limiter 95 to remove any amplitude modulations from the amplified output of the photo-electric cells 90, 91 and 92. The constant amplitude output of the limiter 95 is in turn impressed upon a discriminator 96 which distinguishes or interprets changes in frequency in a manner well understood by those skilled in the art. The discriminator 96 is tuned to the center frequency of the filters 80, 81 and 82 so that frequencies higher than the center frequency will produce a direct current output voltage of one polarity (negative) while frequencies lower than the center frequency will produce a direct current output voltage of the other polarity (positive), the magnitude of the output voltages varying with the extent of frequency departure from the center frequency. The variable polarity direct current output voltage of the discriminator 96 is connected to a direct current amplifier 97 which in turn supplies an auxiliary direct current motor schematically illustrated at 98. The shaft of the auxiliary direct current motor 98 is connected to the shaft of a main direct current motor 99 which replaces the synchronous motor 26 of Fig. 1 of the drawings. Preferably the motor 99, which is illustrated as an ordinary series field type motor the speed regulations of which varies with load, supplies the major portion of the driving power required for rotating the drum 16. If the direct current voltage output of the discriminator 96 is in the positive direction indicating that the frequency of the signal energy is lower than the center frequency of the filters 80, 81 and 82, the direct current motor 98 will be driven in such a direction as to decrease the load on the motor 99, in other words auxiliary motor 98 will carry more of the load of the rotating drum 16 and an increased speed of the drum will result. The reflections will therefore be of a higher frequency when they intercept the photo-electric cells 36, 37 and 38. Similarly if the voltage output of the discriminator is in a negative direction, the auxiliary motor 98 will supply less driving power and the load on motor 99 will be increased resulting in a decreased speed of the drum 16 and a lower frequency of the reflections when they intercept the photo-electric cells 36, 37 and 38. The time constant of the discriminator network [90] *96* is preferably such that the speed adjustment determined by the "leading" photo-electric cell bank comprising photo-electric cells 90, 91 and 92 will have been made before the reflections on the traces arrive at the photo-electric cells 36, 37 and 38, respectively. With this arrangement it is obvious that the "leading" bank of photo-electric cells comprising cells 90, 91 and 92 intercepts the energy far enough in advance to adjust the speed and, therefore, the effective frequency of the film or record 10 for optimum response of the amplifier filter network to the reflection signals. In view of the detailed description included above the operation of the arrangement disclosed in Fig. 10 will be obvious to those skilled in the art.

It should be understood that the present invention is not limited to the specific constructions and arrangements described above and that changes and modifications may occur to those skilled in the art without departing from the spirit and scope of the present invention. It is, therefore, aimed in the appended claims to cover all such changes and modifications.

I claim:

1. Apparatus for the analysis of a seismogram which has recorded thereon in the form of a plurality of variable area or variable density tracks the vibrations as received at different points spaced from a source of disturbance in the earth including also a periodically variable timing track recorded simultaneously with said other tracks, including a reproducing means for converting said plurality of tracks on said seismogram to a plurality of visual inspection type traces on a record with spaced timing lines extending across said record corresponding to said timing track, comprising means for moving said seismogram past a source of light, means for converting the information contained in each of said tracks to variable electrical energy, fixed pass band filter means for filtering said electrical energy, oscillographic means for converting said electrical energy to visual inspection traces on said record one corresponding to each of said tracks exclusive of said timing track, means for varying the speed of movement of said seismogram to cause said fixed pass band filter means to exclude wave energy of a predetermined frequency from said visual inspection traces, means for converting the signals appearing in said periodically variable timing track into an alternating potential, a synchronous timing motor, means driven by said synchronous timing motor for producing said timing lines on said record, and means for energizing said timing motor with said alternating potential so that the timing lines on said record will bear the proper time relationship to said traces regardless of the variations in speed of movement of said seismogram while in said reproducing means.

2. Apparatus for the analysis of a seismogram which has recorded thereon in the form of a plurality of variable area or variable density tracks the vibrations as received at different points spaced from a source of disturbance in the earth including also a periodically variable timing track recorded simultaneously with said other tracks, including a reproducing means for converting said plurality of tracks on said seismogram to a plurality of visual inspection type traces on a record with spaced timing lies thereon corresponding to said timing track, comprising means for moving said seismogram past a source of light, means for converting the information contained in each of said tracks to variable electrical energy, fixed pass band filter means for filtering said electrical energy, oscillographic means for converting said electrical energy to visual inspection traces on said record one corresponding to each of said tracks exclusive of said timing track, means for moving at a predetermined higher than normal speed said seismogram while in said reproducing means to cause said fixed pass band filter means to exclude wave energy of a frequency below a predetermined value from said visual inspection traces, means for converting the signals appearing in said periodically variable timing track into an alternating potential, a synchronous timing motor, means driven by said synchronous timing motor for producing said timing lines on said record, and means for energizing said timing motor from said alternating potential so that the timing motor operates at a speed which corresponds to said predetermined higher than normal speed of said seismogram.

3. Apparatus for the analysis of a seismogram which has recorded thereon in the form of a plurality of variable area or variable density tracks the vibrations as received at different points spaced from a source of disturbance in the earth including also a periodically variable timing track recorded simultaneously with said other tracks, including a reproducing means for converting said plurality of tracks on said seismogram to a plurality of visual inspection type traces on a record with spaced timing lines thereon corresponding to said timing track, comprising means for moving said seismogram past a source of light, means for converting the information contained in each of said tracks to variable electrical energy, fixed band pass filter means for filtering said electrical energy, oscillographic means for converting said electrical energy to visual inspection traces on said record one corresponding to each of said tracks exclusive of timing track, means for moving at a predetermined lower than normal speed said seismogram while in said reproducing means to cause said fixed pass band filter means to exclude wave energy of a frequency above a predetermined value from said visual inspection traces, means for converting the signals appearing in said periodically variable timing track into an alternating potential, a synchronous timing motor, means driven by said synchronous timing motor for producing said timing lines on said record, and means for energizing said timing motor from said alternating potential so that the timing motor operates at a speed which corresponds to said predetermined lower than normal speed of said seismogram.

4. Apparatus for the analysis of a seismogram which has recorded thereon in the form of a plurality of phonographically reproducible records the vibrations as received at different points spaced from a source of disturbance in the earth including also a sinusoidally variable timing record recorded simultaneously with said other records, including a reproducing means for converting said plurality of records on said seismogram to a plurality of visual inspection type traces on a record with spaced timing lines extending across said record corresponding to said timing track, comprising a reproducing device for converting the information contained in each of said records to variable electrical energy, means for moving said seismogram relative to said reproducing device, a band pass filter including means for expanding or contracting its pass band characteristics about a fixed center frequency for filtering said electrical energy, oscillographic means for converting said electrical energy to visual inspection traces on said record, means for varying the speed of movement of said seismogram while in said reproducing means to cause said speed to correspond with the fixed center frequency of said filter, and means for expanding or contracting the pass band characteristic of said filter to exclude wave energy above and below a predetermined frequency from said visual inspection traces.

5. Apparatus for the analysis of a seismogram which has recorded thereon in the form of a plurality of variable area or variable density tracks the vibrations as received at different points spaced from a source of disturbance in the earth, including a reproducing means for converting said plurality of tracks on said seismogram to a plurality of visual inspection type traces on a record, comprising means for moving said seismogram past a source of light, means for converting the information contained in each of said tracks to variable electrical energy, a plurality of bank pass filters one for each of said tracks and each including means of expanding or contracting its pass band characteristics about a fixed center frequency for filtering said electrical energy, oscillographic means for converting said electrical energy to visual inspection traces on said record, means for varying the speed of movement of said seismogram while in said reproducing means to cause said speed to correspond with the fixed center frequency of said filter, and means for expanding or contracting the pass band characteristic of said filter to exclude wave energy above and below a predetermined frequency from said visual inspection traces.

6. Apparatus for the analysis of a seismogram which has recorded thereon in the form of a plurality of variable area or variable density tracks the vibrations as received at different points spaced from a source of disturbance in the earth, including a reproducing means for converting said plurality of tracks on said seismogram to a plurality of visual inspection type traces on a record, comprising a rotatable transparent drum, means for mounting said seismogram on said drum for movement therewith, means for rotating said drum to move said seismogram past a source of light, means for converting the information contained in each of said tracks to variable electrical energy, a band pass filter including means for expanding or contracting its pass band characteristics about a fixed center frequency for filtering said electrical energy, oscillographic means for converting said electrical energy to visual inspection traces on said record, means for varying the speed of rotation of said drum to cause said speed to correspond with the fixed center frequency of said filter, and means for expanding or contracting the pass band characteristics of said filter to exclude wave energy above and below a predetermined frequency from said visual inspection traces.

7. Apparatus for the analysis of a seismogram which has recorded thereon in the form of a phonographically reproducible record the vibrations as received at a point spaced from a source of disturbance in the earth, comprising a reproducing means for converting said record to a corresponding visual inspection type trace including means for movably supporting said seismogram, means including a change speed mechanism for operating said last-mentioned means, means operative in response to movement of said seismogram for converting the information contained in said record to variable electrical energy, fixed pass band filter means for filtering said electrical energy, oscillographic means for converting said electrical energy to a visual inspection trace, and means for automatically controlling said change speed mechanism to vary the rate at which said seismogram moves during the reproduction thereof in accordance with a predetermined time function.

8. Apparatus for the analysis of a seismogram which has recorded thereon in the form of a plurality of variable area or variable density tracks the vibrations as received at different points spaced from a source of disturbance in the earth, comprising a reproducing means for converting said tracks to corresponding visual inspection type traces including means for movably supporting said seismogram, means including a change speed mechanism for operating said last-mentioned means, means operative in response to movement of said seismogram for converting the information contained in said tracks to variable electrical energy, fixed pass band filter means for filtering said electrical energy, oscillographic means for converting said electrical energy to visual inspection type traces, and means including a rotatable cam for automatically controlling said change speed mechanism to vary the rate at which said seismogram moves during the reproduction thereof in accordance with a predetermined time function.

[9. Apparatus for the analysis of a seismogram which has recorded thereon in the form of a plurality of variable area or variable density tracks the vibrations as received at different points spaced from a source of disturbance in the earth, comprising a reproducing means for converting said seismogram to a record having a plurality of visual inspection type traces thereon each corresponding to one of said tracks including a rotatable drum for supporting said seismogram for movement therewith, synchronous means drivingly connected for rotating said drum, means including photoelectric means for converting the information contained in each of said tracks to variable electrical energy in response to rotation of said drum, change speed means interposed between said drum and synchronous means to cause rotation of said drum at speeds substantially above normal to decrease the length of the record produced, and means for controlling said change speed to reduce the step out time of said traces so that visual correlation of traces having a large step out time may be accomplished.]

10. Apparatus for the analysis of a seismogram which has recorded thereon in the form of a plurality of variable area or variable density tracks the reflected wave energy as received at different points spaced from a source of disturbance in the earth, comprising a reproducing means for converting said seismogram to a record having a plurality of visual inspection type traces thereon each corresponding to one of said tracks including a source of light, a plurality of photoelectric cells one for each of said tracks, means for moving said seismogram past said source of light so light therefrom intercepted by said tracks is converted by said photoelectric cells to variable electrical energy by said photoelectric cells in response to movement of said seismogram, oscillographic means for converting said electrical energy to visual inspection type traces, a bank of photoelectric cells excited in accordance with the wave energy recorded in at least certain of said tracks, and means controlled in [accordanoce] *accordance* with excitation of said bank of photoelectric cells for varying the speed of movement of said seismogram in accordance with frequency variations of said reflected wave energy as recorded in said tracks.

11. Apparatus for the analysis of a seismogram which has recorded thereon in the form of a plurality of variable area or variable density tracks the reflected wave energy as received at different points spaced from a source of disturbance in the earth, comprising a reproducing means for converting said seismogram to a record having a plurality of visual inspection type traces thereon each corresponding to one of said tracks including a source of light, a plurality of photoelectric cells one for each of said tracks, means for moving said seismogram past said source of light so light therefrom intercepted by said tracks is converted to variable electrical energy by said photoelectric cells in response to movement of said seismogram, oscillographic means for converting said electrical energy to visual inspection type traces, and means responsive to frequency variations of said reflected wave energy for correspondingly varying the speed of movement of said seismogram.

12. Apparatus for the analysis of a seismogram which has recorded thereon in the form of a plurality of variable area or variable density tracks the reflected wave energy as received at different points spaced from a source of disturbance in the earth, comprising a reproducing means for converting said seismogram to a record having a plurality of visual inspection type traces thereon each corresponding to one of said tracks including a source of light, a first group of photoelectric cells one for each of said tracks, means for moving said seismogram past said source of light so light therefrom intercepted by said tracks is converted to variable electrical energy by said photoelectric cells in response to movement of said seismogram, oscillographic means for converting said electrical energy to visual inspection type traces, a second group of photoelectric cells one for each of said tracks for receiving the light from said source as intercepted by said tracks ahead of said first group of photoelectric cells, and means responsive to the algebraic sum of the responses of said second group of photoelectric cells for varying the speed of movement of said seismogram in accordance with the frequency variations of said reflected wave energy.

13. Apparatus for the analysis of a seismogram which has recorded thereon in the form of a plurality of variable area or variable density tracks the reflected wave energy as received at different points spaced from a source of disturbance in the earth, comprising a reproducing means for converting said seismogram to a record having a plurality of visual inspection type traces thereon each corresponding to one of said tracks including a hollow transparent rotatable drum for supporting said seismogram for movement therewith, means for rotating said drum, a first group of photoelectric cells disposed within said drum one for each of said tracks for converting the information contained in each of said tracks to variable electrical energy in response to rotation of said drum, oscillographic means for converting said electrical energy to visual inspection type traces, a second group of photoelectric cells displaced from one another by the step out times of the reflected energy recorded in the associated tracks and disposed within said drum relative to said first group so as to respond to the wave energy recorded in said tracks prior to an identical response by said first group of photoelectric cells, means for rotating said drum, and means responsive to the algebraic sum of the outputs of said second group of photoelectric cells for varying the speed at which said last-mentioned means rotates said drum whereby said drum speed varies in accordance with the frequency variations of said reflected energy.

14. In a system for converting a phonographically reproducible seismic record into a visual trace seismic record, the means for converting a recording of a periodic timing wave on said phonographically reproducible record into timing lines of said visual trace record, which comprises means for converting said recorded periodic timing wave to an alternating potential, a synchronous timing motor, means driven by said synchronous timing motor for producing said timing lines on said visual trace record, and means for energizing said timing motor from said alternating potential so that the timing lines on said visual trace record will bear the proper time relationship to the seismic wave traces on said visual trace record.

*15. Apparatus for the analysis of a seismogram which has recorded thereon in the form of a plurality of signal tracks the reflected wave energy as received at different points spaced from a source of disturbance in the earth, comprising reproducing means for converting said seismogram to a record having a plurality of visual inspection type traces thereon each corresponding to one of said tracks including a first group of reproducing means one for each of said tracks, means for moving said seismogram past said first group of reproducing means so that the signals appearing thereon are converted to variable electrical energy in response to movement of the seismogram, means for converting said variable electrical energy to visual inspection type traces, a second group of reproducing means one for each of said tracks arranged in proximity to said seismogram but displaced in the direction of movement of said seismogram from said first group of reproducing means for reproducing the signals appearing on said seismogram prior to the reproduction of these signals by the first group of reproducing means, and means responsive to the algebraic sum of the signals reproduced by said second group of reproducing means for altering at least one of the characteristics of the signals reproduced by said first group of reproducing means in accordance with the reflected wave energy appearing on said seismogram.*

*16. Apparatus for the analysis of a seismogram which has recorded thereon in the form of a plurality of signal tracks the reflected wave energy as received at different points spaced from a source of disturbance in the earth, comprising reproducing means for converting said seismogram to a record having a plurality of visual inspection type traces thereon each corresponding to one of said tracks including a first group of reproducing means one for each of said tracks, means for moving said seismogram past said first group of reproducing means in order to reproduce the signals recorded on said seismogram in response to movement of the seismogram, means for converting the reproduced signals to visual inspection type traces, a second group of reproducing means one for each of said tracks arranged in proximity to said seismogram but displaced in the direction of movement of said seismogram from said first group of reproducing means for reproducing the signals appearing on said seismogram prior to the reproduction of these signals by the first group of reproducing means, and means jointly responsive to the signals reproduced by said second group of reproducing means for altering at least one of the characteristics of the signals reproduced by said first group of reproducing means.*

*17. Apparatus for reproducing and translating the seismic signals recorded on a phonographically reproducible record as a plurality of signal traces, these traces representing the energy received at different points spaced from at least one source of disturbance, which apparatus comprises a pair of spaced reproducing means associated with each of the signal traces, means for moving said record past the reproducing means in sequence so that the first reproducing means of each pair reproduces the signals of its associated trace prior to the reproduction of the same signals by the other reproducing means of each pair, means responsive to the signals reproduced by the first reproducing means of all of the pairs to provide a control signal, means responsive to said control signal for altering the characteristics of the signals reproduced by the second reproducing means of each pair in order to provide a controlled signal, and means for translating said controlled signal into visible manifestations.*

*18. Apparatus for reproducing the seismic signals recorded on a phonographically reproducible record as a plurality of signal traces, these traces representing the energy received at different points spaced from at least one source of disturbance, which apparatus comprises a pair of spaced reproducing means associated with each of the signal traces, means for moving said record past the reproducing means in sequence so that the first reproducing means of each pair reproduces the signals of its associated trace prior to the reproduction of the same signals by the other reproducing means of each pair, means responsive to the signals reproduced by the first reproducing means of all of the pairs to provide a control signal, and means responsive to said control signal for altering the characteristics of the same signals when reproduced by the second reproducing means of each pair.*

*19. Apparatus for reproducing and translating the signals recorded on a phonographically reproducible record as a plurality of signal traces, these traces representing the energy received at different points spaced from at least one source of disturbance, comprising a pair of spaced reproducing means associated with each of said traces, means for moving the record in sequence past said reproducing means whereby the reproducing means of each pair reproduces at different times the signals of its associated trace, the spacing between the reproducing means of each pair controlling the time difference between the reproduction of said signals, and means jointly responsive to the signals reproduced by the first reproducing means of each pair for altering the characteristics of the signals reproduced by the second reproducing means of each pair .*

*20. Apparatus for reproducing and translating the signals recorded on a phonographically reproducible record as a plurality of signal traces, these traces representing the energy received at different points spaced from at least one source of disturbance, comprising a pair of spaced reproducing means associated with each of said traces, means for moving the record in sequence past said reproducing means whereby the reproducing means of each pair reproduces at different times the signals of its associated trace, the spacing between the reproducing means of each pair controlling the time difference between the reproduction of said signals, and means responsive to the algebraic sum of the signals reproduced by the first reproducing means of each pair for altering the characteristics of the signals reproduced by the second reproducing means of each pair.*

*21. Apparatus for reproducing the seismic signals recorded on a phonographically reproducible record as a plurality of signal traces, these traces representing the energy received at different points spaced from at least one source of disturbance, which apparatus comprises a pair of spaced reproducing means for each of said traces, means for moving the record in sequence past said reproducing means whereby the reproducing means of each pair reproduces at different times the signals from its associated trace, and means jointly responsive to the signals reproduced by the first reproducing means of each pair for altering the characteristics of the signals reproduced by the second reproducing means of each pair.*

22. Apparatus for the analysis of a seismogram which has recorded thereon in the form of at least one signal track the reflected wave energy as received at a point spaced from a source of disturbance in the earth together with random noises and other spurious signals received at said point, comprising reproducing means for converting said seismogram to a record having at least one visual inspection type trace thereon corresponding to said track including a first reproducing means positioned in proximity to said track, means for moving said seismogram past said first reproducing means so that the signals appearing on said seismogram are converted to variable electrical energy in response to movement of the seismogram, means for converting said variable electrical energy to a visual inspection type trace, a second reproducing means arranged in proximity to said track but displaced from said first reproducing means in a direction opposite to the direction of movement of said seismogram for reproducing the signals appearing on said seismogram prior to the reproduction of these same signals by the first reproducing means in response to the movement of the seismogram, means responsive to the signals reproduced by said second reproducing means for developing polarized control signals varying as a function of the characteristics of the signal reproduced by said second reproducing means, and means responsive to the amplitude and polarity of said control signals for altering at least one of the characteristics of the signals reproduced by said first reproducing means in order to accentuate the reflected wave energy reproduced from said seismogram.

23. Apparatus for reproducing a plurality of seismic signals having different frequencies and recorded as a signal channel on a phonographically reproducible record, which seismic signals comprise energy from a source of seismic waves reflected to a receiving position from one or more subsurface strata together with random noises and other spurious responses, said apparatus comprising at least two spaced reproducing means associated with said signal channel for reproducing and translating the signals of said channel into variable electrical energy, means for moving said record past said reproducing means in sequence whereby the two reproducing means reproduce the signals from said channel at different times, means responsive to the frequency of the electrical energy produced by the first of said reproducing means for developing control signals varying in amplitude as a function of said frequency, and means responsive to said control signals for altering the signals reproduced by the second of said reproducing means so as to accentuate signals of predetermined frequency.

24. Apparatus for reproducing and translating the seismic signals recorded on a phonographically reproducible record in the form of a signal trace, which seismic signals comprise energy from a source of seismic waves reflected to a receiving position from one or more subsurface strata together with random noises and other spurious responses, said apparatus comprising at least two spaced reproducing means, means for moving said record past said two reproducing means in sequence in order to reproduce the signals of said trace at different times, means responsive to the signals reproduced by one of said reproducing means for developing polarized control signals varying in polarity as a function of one of the characteristics of the signals produced by said one reproducing means, means responsive to said control signals for altering the characteristics of the signals reproduced by the other of said reproducing means, and means for translating the altered signals into visible manifestations in order to produce a visible trace corresponding to the signal trace appearing on said record.

25. Apparatus for reproducing the seismic signals recorded on a phonographically reproducible record in the form of a signal trace, which seismic signals comprise energy from a source of seismic waves reflected to a receiving position from one or more subsurface strata together with random noises and other spurious signals, said apparatus comprising a pair of spaced reproducing means associated with said signal trace, means for moving said record past said reproducing means in sequence so that each reproducing means reproduces at different times corresponding signals of said trace, means responsive to the signals reproduced by the first of said reproducing means for developing control signals varying in amplitude as a function of deviations of said frequency from a predetermined value, and means responsive to said control signals for altering the characteristics of the signals reproduced by the second of said reproducing means, the means for developing said control signals being effective to supply said control signals to the altering means prior to the reproduction of corresponding signals by said second reproducing means.

26. Apparatus for reproducing the seismic signals recorded on a phonographically reproducible record in the form of a signal trace, which seismic signals comprise energy from a source of seismic waves reflected to a receiving position from one or more subsurface strata together with random noises and other spurious signals, said apparatus comprising a pair of spaced reproducing means associated with said trace, means for moving said record past said reproducing means in sequence so that each reproducing means reproduces at different times corresponding signals of said trace, means responsive to the signals reproduced by the first of said reproducing means for developing polarized control signals varying in amplitude as a function of one of the characteristics of the signals reproduced by said first reproducing means, and means responsive to said control signals for altering the characteristics of the signals reproduced by the second reproducing means in order to accentuate the reproduced signals corresponding to the reflected wave energy on said record, the means for developing said control signals being effective to supply said control signals to the altering means prior to the reproduction of corresponding signals by said second reproducing means.

27. Apparatus for the analysis of a seismogram which has recorded thereon in the form of at least one signal tract the reflected wave energy as received at a point spaced from a source of disturbance in the earth together with random noises and other spurious signals received at said point, said apparatus comprising reproducing means for converting said seismogram to a record having at least one visual inspection type trace thereon corresponding to said tract and including a first reproducing means positioned in proximity to said tract, means for moving said seismogram past said first reproducing means so that the signals appearing on said seismogram are converted to variable electrical energy in reponse to movement of the seismogram, means for converting said variable electrical energy to a visual inspection type trace, a second reproducing means arranged in proximity to said tract but displaced from said first reproducing means in a direction opposite to the direction of movement of said seismogram for reproducing the signals appearing on said seismogram prior to the reproduction of these same signals by the first reproducing means in response to the movement of the seismogram, means responsive to the variable electrical energy produced by said second reproducing means for developing direct current control signals having an amplitude and polarity varying as a function of the frequencies of the signals reproduced by said second reproducing means, and means responsive to said control signals for altering at least one of the characteristics of the signals reproduced by said first reproducing means in order to accentuate the reflected wave energy reproduced from said record.

28. Apparatus for reproducing the seismic signals recorded on a phonographically reproducible record as a plurality of signal traces, these traces representing the energy received at different points spaced from at least one source of disturbance, which apparatus comprises a pair of spaced reproducing means for each of said traces,

*means for moving the record in sequences past said reproducing means whereby the reproducing means of each pair reproduces at different times the signals from its associated trace, means jointly responsive to the signals reproduced by the first reproducing means of each pair for altering the characteristics of the signals reproduced by the second reproducing means of at least one of said pairs.*

*29. Apparatus for reproducing the seismic signals recorded on a phonographically reproducible record as a plurality of signal traces, these traces representing the energy received at different points spaced from at least one source of disturbance, which apparatus comprises a pair of spaced reproducing means associated with each of the signal traces, means for moving said record past the reproducing means in sequence so that the first reproducing means of each pair reproduces the signals of its associated trace prior to the reproduction of corresponding signals by the other reproducing means of each pair, means responsive to the signals reproduced by the first reproducing means of all of the pairs to provide a control signal, and means responsive to said control signal for altering the characteristics of the same signals when reproduced by the second reproducing means of each pair, the means for developing said control signals being effective to supply said control signals to the altering means prior to the reproduction of corresponding signals by said second reproducing means.*

*30. Apparatus for reproducing and translating seismic signals recorded on a phonographically reproducible record in the form of a signal trace, said apparatus comprising a pair of spaced reproducing means, means for moving said record past said reproducing means in sequence in order to reproduce the signals of said trace at different times, means responsive to the signals reproduced by one of said reproducing means for developing polarized control signals having a polarity varying as a function of one of the characteristics of the signals produced by said one reproducing means, and means responsive to said control signals for altering the characteristics of the signals reproduced by the other of said reproducing means.*

*31. Apparatus for reproducing and translating seismic signals recorded on a phonographically reproducible record in the form of a signal trace, said apparatus comprising a pair of spaced reproducing means, means for moving said record past said reproducing means in sequence in order to reproduce the signals of said trace at different times, means responsive to the signals reproduced by one of said reproducing means for developing polarized control signals varying in amplitude and polarity as a function of one of the characteristics of the signals produced by said one reproducing means, and means responsive to said control signals for altering the characteristics of the signals reproduced by the other of said reproducing means.*

*32. Apparatus for reproducing and translating seismic signals recorded on a phonographically reproducible record in the form of a signal trace, said apparatus comprising a pair of spaced reproducing means, means for moving said record past said reproducing means in sequence in order to reproduce the signals of said trace at different times, means responsive to the signals reproduced by one of said reproducing means for developing polarized control signals varying in polarity in accordance with the deviation in frequency of the signals reproduced by said one reproducing means from a predetermined value, and means responsive to said control signals for altering the characteristics of the signals reproduced by the other of said reproducing means..*

*33. Apparatus for reproducing and translating seismic signals recorded on a phonographically reproducible record in the form of a signal trace, said apparatus comprising a pair of spaced reproducing means, means for moving said record past said reproducing means in sequence in order to reproduce the signals of said trace at different times, means responsive to the signals reproduced by one of said reproducing means for developing polarized control signals varying in polarity and amplitude in accordance with the deviation in frequency of the signals reproduced by said one reproducing means from a predetermined value, and means responsive to said control signals for altering the characteristics of the signals reproduced by the other of said reproducing means.*

*34. Apparatus for reproducing and translating seismic signals recorded on a phonographically reproducible record in the form of a signal trace, said apparatus comprising a pair of spaced reproducing means, means for moving said record past said reproducing means in sequence in order to reproduce corresponding signals of said trace at different times, means responsive to the signals reproduced by one of said reproducing means for developing polarized control signals having a polarity varying as a function of one of the characteristics of the signals produced by said one reproducing means, and means responsive to said control signals for altering the characteristics of the signals reproduced by the other of said reproducing means, the means for developing said control signals being effective to supply said control signals to the altering means prior to the reproduction of corresponding signals by said other reproducing means.*

*35. Apparatus for reproducing and translating seismic signals recorded on a phonographically reproducible record in the form of a signal trace, said apparatus comprising a pair of spaced reproducing means, means for moving said record past said reproducing means in sequence in order to reproduce the signals of said trace at different times, means responsive to the frequency of the signals reproduced by one of said reproducing means for developing control signals varying as a function of the deviation of said frequency from a predetermined value, and means responsive to said control signals for altering the signals reproduced by the second of said reproducing means in order to accentuate signals having a frequency equal to said predetermined value.*

*36. Apparatus for reproducing and translating seismic signals recorded on a phonographically reproducible record in the form of a signal trace, said apparatus comprising a pair of spaced reproducing means, means for moving said record past said reproducing means in sequence in order to reproduce corresponding signals of said trace at different times, means responsive to the frequency of the signals reproduced by one of said reproducing means for developing control signals varying as a function of the deviation of said frequency from a predetermined value, and means responsive to said control signals for altering the signals reproduced by the second of said reproducing means in order to accentuate signals having a frequency equal to said predetermined value, the means for developing said control signals being effective to supply said control signals to the altering means prior to the reproduction of corresponding signals by said second reproducing means.*

References Cited in the file of this patent or the original patent

UNITED STATES PATENTS

| | | |
|---|---|---|
| 463,188 | Gibboney | Nov. 17, 1891 |
| 520,106 | Cox | May 22, 1894 |
| 1,555,281 | Engl et al. | Sept. 29, 1925 |
| 2,085,205 | Warncke | June 29, 1937 |
| 2,144,812 | Rieber | Jan. 24, 1939 |
| 2,206,547 | Gerlach | July 2, 1940 |
| 2,243,729 | Ellis | May 27, 1941 |
| 2,243,730 | Ellis | May 27, 1941 |
| 2,275,735 | Cloud | Mar. 10, 1942 |
| 2,313,091 | Renner | Mar. 9, 1943 |
| 2,394,990 | Eisler | Feb. 19, 1946 |
| 2,490,461 | McKinney | Dec. 6, 1949 |
| 2,521,130 | Scherbatskoy | Sept. 5, 1950 |